(12) United States Patent
Hartog et al.

(10) Patent No.: US 8,326,095 B2
(45) Date of Patent: Dec. 4, 2012

(54) TILT METER INCLUDING OPTICAL FIBER SECTIONS

(75) Inventors: Arthur H. Hartog, Martyr Worthy (GB); Robert Greenaway, Frimley (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 432 days.

(21) Appl. No.: 12/701,703

(22) Filed: Feb. 8, 2010

(65) Prior Publication Data
US 2011/0194806 A1 Aug. 11, 2011

(51) Int. Cl.
*G02B 6/00* (2006.01)
(52) U.S. Cl. .......................................................... 385/13
(58) Field of Classification Search ............... 385/12, 385/13, 14, 15, 16
See application file for complete search history.

(56) References Cited

U.S. PATENT DOCUMENTS

| | | | |
|---|---|---|---|
| 4,210,029 A * | 7/1980 | Porter | 73/705 |
| 4,593,701 A * | 6/1986 | Kobayashi et al. | 600/480 |
| 4,639,196 A * | 1/1987 | Kirkland, Jr. | 417/228 |
| 4,784,144 A * | 11/1988 | Ono et al. | 600/325 |
| 4,933,545 A * | 6/1990 | Saaski et al. | 250/227.14 |
| 5,841,131 A | 11/1998 | Schroeder et al. | |
| 6,246,048 B1 | 6/2001 | Ramos et al. | |
| 6,304,686 B1 | 10/2001 | Yamate et al. | |
| 6,363,180 B1 | 3/2002 | Yamate et al. | |
| 6,644,402 B1 | 11/2003 | Sharma et al. | |
| 6,789,621 B2 | 9/2004 | Wetzel et al. | |
| 6,946,645 B2 | 9/2005 | Tarvin et al. | |
| 7,021,388 B2 | 4/2006 | Williams | |
| 7,240,730 B2 | 7/2007 | Williams et al. | |
| 7,617,873 B2 | 11/2009 | Lovell et al. | |
| 2002/0064330 A1 | 5/2002 | Croteau et al. | |
| 2004/0112595 A1 | 6/2004 | Bostick et al. | |
| 2004/0114849 A1 | 6/2004 | Shah et al. | |
| 2005/0140966 A1 | 6/2005 | Yamate et al. | |
| 2007/0163780 A1 | 7/2007 | Onodera et al. | |
| 2008/0095496 A1 | 4/2008 | Varadarajan et al. | |
| 2008/0212917 A1 | 9/2008 | Chen | |
| 2009/0260834 A1 * | 10/2009 | Henson et al. | 166/385 |

FOREIGN PATENT DOCUMENTS

| | | |
|---|---|---|
| EP | 0530171 A1 | 3/1993 |
| GB | 2419401 A | 4/2006 |
| GB | 2440956 A | 2/2008 |
| GB | 2451560 A | 2/2009 |

OTHER PUBLICATIONS

JP 58-127116A Abstract. Hara Denshi Sokki KK. Jul. 28, 1983.
T. Yamate, R.T. Ramos, R.J. Schroeder, E. Udd, "Thermally Insensitive Pressure Measurements up to 300 C Using Fibre Bragg Gratings Written onto Side Hole Single Mode Fibre", 14th International Conference on Optical Fibre Sensors (OFS-14), Venice, Italy, SPIE vol. 4185, pp. 628-631, Oct. 11-13, 2000.

* cited by examiner

*Primary Examiner* — Akm Ullah
(74) *Attorney, Agent, or Firm* — Brandon S. Clark; Rodney V. Warfford

(57) ABSTRACT

A tilt meter includes a housing structure defining an inner chamber sealed from an environment outside the housing structure. First and second optical fiber sections are provided in the inner chamber. The second optical fiber section is optically coupled to the first optical fiber section, with the second optical fiber section rotated azimuthally with respect to the first optical fiber section. The first and second optical fiber sections are arranged to receive light transmitted from a remote light source, and a tilt of the housing structure induces a differential pressure within the inner chamber to be detected by the first and second optical fiber sections.

14 Claims, 3 Drawing Sheets

TILT METER INCLUDING OPTICAL FIBER SECTIONS

BACKGROUND

Wells are drilled into an earth formation to extend to a target reservoir of interest. The reservoir can include hydrocarbons, fresh water, or other fluids of interest for production to the earth surface. Alternatively, fluids can be injected from the earth surface into the reservoir within the formation.

Many wells include horizontal segments that run relatively horizontally through a reservoir. However, a "horizontal" well segment is usually not perfectly horizontal, since there usually are local deviations from the horizontal direction in the "horizontal" well segment. Such local deviations include slanted portions that can be slanted upwardly or downwardly such that the slanted portions are angled with respect to the horizontal direction.

Measuring such local deviations from the horizontal direction in a "horizontal" well segment can be challenging using conventional techniques. One example of a conventional technique of surveying a well includes running an intervention tool into the well, such as on a wireline or other carrier structure. The intervention tool includes various types of sensors, including navigation sensors (e.g., inertial sensors such as gyroscopes and accelerometers), or sensors referencing the earth's magnetic field or gravitational field. However, having to run an intervention tool for measuring local deviations of the well from the horizontal direction can be time consuming and costly.

SUMMARY

In general, according to an embodiment, a tilt meter includes a housing structure defining an inner chamber sealed from an environment outside of the housing structure. First and second optical fiber sections are provided in the inner chamber. The second optical fiber section is optically coupled to the first optical fiber section, with the second optical fiber section rotated azimuthally with respect to the first optical fiber section. The first and second optical fiber sections are arranged to receive light transmitted from a remote light source, and a tilt of the housing structure induces a differential pressure within the inner chamber to be detected by the first and second optical fiber sections.

Other or alternative features will become apparent from the following description, from the drawings, and from the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying drawings illustrate only the various implementations described herein and are not meant to limit the scope of various technologies described herein. The drawings are as follows.

DETAILED DESCRIPTION

Figure 1:
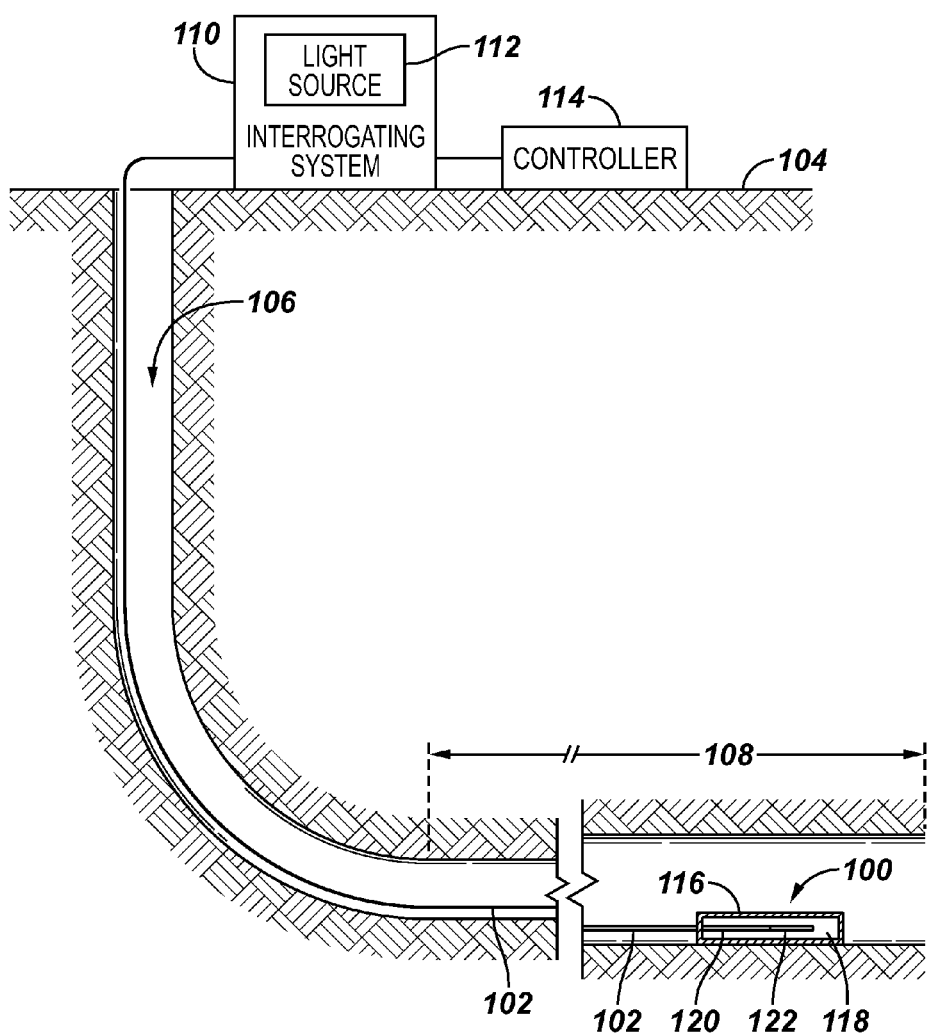
FIG. 1 is a schematic diagram of a well arrangement that includes a tilt meter according to some embodiments.

As used here, the terms "above" and "below"; "up" and "down"; "upper" and "lower"; "upwardly" and "downwardly"; and other like terms indicating relative positions above or below a given point or element are used in this description to more clearly describe some embodiments of the disclosure. However, when applied to equipment and methods for use in wells that are deviated or horizontal, such terms may refer to a left to right, right to left, or diagonal relationship as appropriate.

In accordance with some embodiments, a tilt meter that includes an optical fiber sensor is provided. The tilt meter has a housing structure that defines an inner chamber containing a buffer fluid, where the inner chamber is sealed from an environment outside of the housing structure. For example, the tilt meter can be provided in a well that is filled with well fluids. The inner chamber of the housing structure would be hermetically sealed from the well fluids. In this way, the tilt meter can be provided into the well for measuring the tilt of portions of the well, including "horizontal" segments of the well. Although reference is made to providing the tilt meter into wells in some applications, it is noted that the tilt meter according to some embodiments can be used in other applications, including applications at the earth surface, in a body of water, and so forth.

Even though reference is made to a "housing structure" of the tilt meter in the singular sense, it is noted that the housing structure can include a single integral housing structure, or multiple housings that are interconnected together.

At least first and second optical fiber sections are provided inside the inner chamber of the tilt meter, where the second optical fiber section is optically coupled (e.g., spliced) to the first optical fiber section. In some embodiments, the first and second optical fiber sections are azimuthally rotated about their longitudinal axes by approximately 90° with respect to one another. "Approximately" 90° refers to 90° or any other angle within a range of angles that includes 90°, where this range of angles is defined based on some predefined tolerance. For example, the predefined tolerance could be ±10° on either side of 90°. In other implementations, instead of azimuthally rotating the first and second optical fiber sections with respect to one another by approximately 90°, the first and second optical fiber sections can be rotated azimuthally with respect to one another angle, such as by at least 45° (45° or more).

The first and second optical fiber sections of the tilt meter are arranged to receive light transmitted from a remote light source, such as a light source located at the earth surface from which a well extends. A tilt of the housing structure induces a change in hydrostatic pressure in different parts of the buffer fluid within the inner chamber of the tilt meter. As a result, the first and second optical fiber sections detect a differential pressure induced by the tilt of the housing structure. The detected differential pressure is communicated using optical signals back to an interrogating system, which can derive the tilt of the housing structure based on the detected differential pressure.

FIG. 1 illustrates an example arrangement that includes a tilt meter 100 according to some embodiments. The tilt meter 100 is connected to an optical fiber cable 102 that extends from an earth surface 104 into a well 106. The tilt meter 100 is located in a horizontal segment 108 of the well 106. At the earth surface 104, the optical fiber cable 102 is connected to an interrogating system 110, which has a light source 112 (e.g., a laser source). The interrogating system 110 also includes a detection subsystem (not shown) that is able to process light reflected back from the tilt meter 100 over the optical fiber table 102. The interrogation system 110 is coupled to a controller 114, which can be implemented with a computer or other type of processing system. The controller 114 can be considered to be part of the interrogation system 110 in some example implementations.

The controller 114 receives information (e.g., information representing a differential pressure communicated by the tilt meter 100) detected by the detection subsystem of the interrogating system 110. Based on such information received from the detection subsystem, the controller 114 is able to derive a tilt of a portion of the well 106 measured by the tilt meter 100.

As further depicted in FIG. 1, the tilt meter 100 includes a housing structure 116 (a singular structure or an assembly of multiple housings) that defines at least a first inner space 118. Note that the arrangement of the tilt meter 100 shown in FIG. 1 is a general schematic depiction that omits some details. There can be other sealing structures within the housing structure 116 to allow for the definition of more than one inner chamber.

The first inner chamber 118 is filled with a buffer fluid. The buffer fluid in some embodiments has a relatively high density and can be formed of a liquid metal. Such a buffer fluid can effectively transfer pressure and yet block the influence of water or hydrogen (or other fluid) ingress into the first inner chamber 118.

First and second optical fiber sections 120 and 122, respectively, are immersed in the buffer fluid within the first inner chamber 118. The buffer fluid in the first inner chamber 118 is associated with a hydrostatic pressure. If the housing structure 116 deviates from the horizontal, variation in the hydrostatic pressure of the buffer fluid in the first inner chamber 118 will occur, where this variation of the hydrostatic pressure will induce a change in pressure on each of the first and second optical fiber sections 120 and 122. As a result, when the housing structure 116 is tilted away from the horizontal direction (angled with respect to the horizontal direction), a differential pressure will be detected by the first and second optical fiber sections 120 and 122. Signals detected by the first and second optical fiber sections 120 and 122 are propagated back over the fiber optic cable 102 to the interrogating system 110, for detection and processing.

Further details of the tilt meter 100 are explained in connection with FIG. 2, discussed further below.

In accordance with some embodiments, the parameter that is detected by each of the first and second optical fiber sections 120 and 122 is pressure. The birefringence of each of the first and second optical fiber sections 120, 122 is affected by an amount that depends on the level of the pressure to which the corresponding optical fiber section is exposed. The difference in birefringence detected by the first and second optical fiber sections is related to a difference in the pressures to which the first and second optical fiber sections 120, 122 are exposed.

In some embodiments, each of the first and second optical fiber sections 120, 122 is a birefringent, polarization-maintaining optical fiber. Such an optical fiber has two principal, orthogonal propagation axes (also referred to as two principal polarization axes) along which light may propagate. The two principal polarization axes are defined by different values of phase velocity for light propagating along the corresponding axes. As a result, light takes different amounts of time to propagate along the two axes, so that the effective optical path length of one axis is longer than the other. The difference between the phase velocities defines the birefringence of the optical fiber. Since the phase velocities of the two principal polarization axes have different responses to the parameter of interest (in this case pressure), the birefringence is a function of the parameter (pressure).

In some embodiments, the first and second optical fiber sections 120 and 122 are chosen to have substantially equal sensitivity to the parameter of interest (e.g., pressure). This may be achieved by using equal lengths of the same type of optical fiber to implement the two optical fiber sections 120, 122. Alternatively, different lengths of the optical fiber sections having different sensitivities per unit length may be used if the products of length and unit sensitivity are matched. Although the sensitivities of the two optical fiber sections 120 and 122 are equal in some implementations, the rotation of one section 120 with respect to the other section 122 introduces a sign change in the sensitivity, so that the two sections 120, 122 have sensitivities of equal magnitude but opposite sign (in some implementations). This allows differential measurements to be made. In other implementations, the two optical fiber sections have sensitivities of opposite sign but different (but known) magnitudes.

Within the first inner chamber 118, the first optical fiber section 120 is exposed to a first pressure, while the second optical fiber section 122 is exposed to a second pressure. If the housing structure 116 of the tilt meter is perfectly horizontal, then the first and second pressures are equal. However, if the housing structure 116 experiences a tilt, then there will be a slight variation in the first and second pressures. An interrogating light signal that is launched through the fiber optic cable 102 and received by the tilt meter 100 is propagated through the first and second optical fiber sections 120, 122. For each of the first and second optical fiber sections 120, 122, a change in the pressure to which the respective optical fiber section is exposed will modify the birefringence by altering the phase velocity difference between the two principal polarization axes. The overall birefringence of the sensor that includes the first and second optical fiber sections 120, 122 is proportional to the difference between the first and second pressures, which provides a measurement of the differential pressure.

Figure 2:
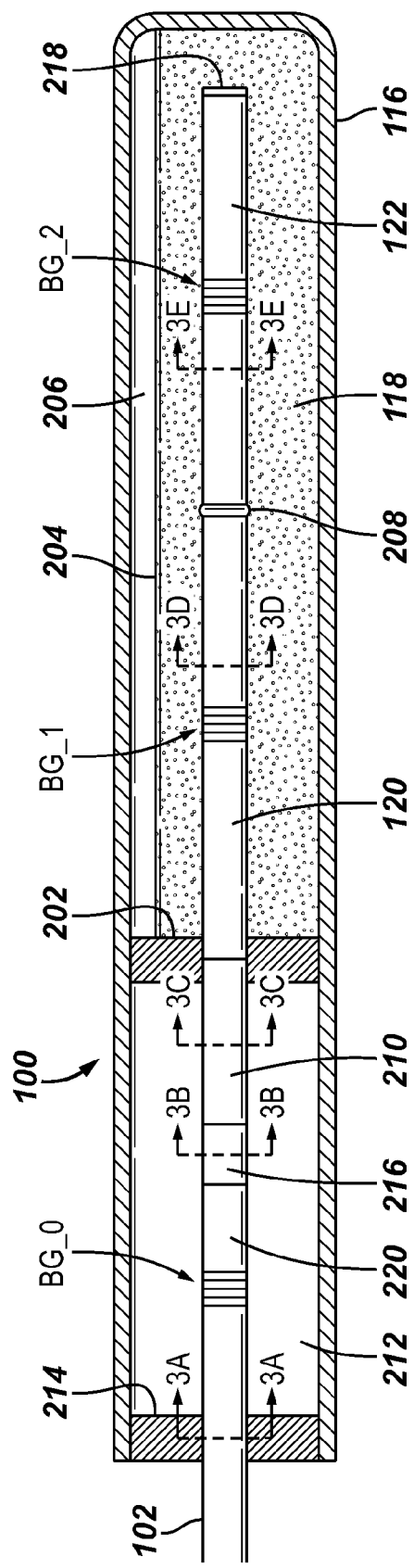
FIG. 2 is a schematic diagram of a tilt meter according to an embodiment.

FIG. 2 illustrates a schematic diagram of the tilt meter 100 in greater detail. The first inner chamber 118 is defined by the housing structure 116 as well as by a pressure barrier 202 (in the form of a pressure feed-through) that allows an optical fiber portion to extend through the pressure barrier. The pressure barrier 202 and the housing structure 116 cooperate to define the hermetic seal to provide fluid isolation between the first inner chamber 118 and an environment outside of the housing structure 116. The first inner chamber 118 contains a buffer fluid 204 in which the first and second optical fiber sections 120, 122 are immersed.

The housing structure 116 and the pressure barrier 202 isolate the pressure within the first inner chamber 118 from pressure outside the housing structure 116. Moreover, in some implementations, a layer of inert gas 206 can be provided inside the first inner chamber 118 to further decouple the first and second optical fiber sections 120, 122 from the pressure outside the tilt meter 100. Examples of the inert gas include helium, xenon, radon, argon, nitrogen, neon, and krypton.

Alternatively, instead of using the layer of inert gas 206, the housing structure 116 can be designed to provide the decoupling of pressure inside the housing structure 116 from pressure outside the housing structure 116.

The first and second optical fiber sections 120 and 122 within the first inner chamber 118 are spliced together at splice point 208. As noted above, in some implementations, the first and second optical fiber sections 120 and 122 are azimuthally rotated with respect to each other by approximately 90° (or by some other angle). Instead of splicing together the first and second optical fiber sections 120 and 122, other mechanisms for optically coupling the first and second optical fiber sections 120 and 122 can be used.

As further depicted in FIG. 2, the first optical fiber section 120 in the first inner chamber 118 is optically coupled through the pressure barrier 202 to a third optical fiber section 210. The third optical fiber section 210 is located within a second inner chamber 212 provided within the housing structure 116, where the second inner chamber 212 is also sealed from the environment outside the housing structure 116. At an end portion of the housing structure 116, another pressure barrier 214 (in the form of a pressure feed-through) is provided. The pressure barriers 202 and 214, in cooperation with the housing structure 116, define the second inner chamber 212.

The third optical coupler section 210 is a biasing element to ensure that a path difference between the two principal polarization axes is provided even in the absence of a differential pressure (such as when the horizontal structure 116 is perfectly horizontal).

The biasing optical fiber portion 210 includes a length of birefringent optical fiber that is coupled in series with the first and second optical fiber sections 120, 122. The biasing optical fiber section 210 has an inherent birefringence that does not respond to changes in the pressure, so that the birefringence of the biasing optical fiber section 210 is fixed with respect to the pressure. The biasing optical fiber section 210 provides the overall sensor with a known fixed component to the sensor's pressure-sensitive birefringence. In the event that there is no differential pressure measured by the first and second optical fiber sections 120, 122, the presence of the biasing optical fiber section 210 prevents the sensor from returning a zero result, so that problems inherent in interrogating a zero birefringence situation are avoided. The offset provided by the biasing optical fiber section 210 allows for a sign of the pressure differential to be determined unambiguously, so that it can be ascertained whether the pressure is higher at the first optical fiber section 120 or the second optical fiber section 122, such that the correct tilt of the housing structure 116 can be determined.

Figure 3A:
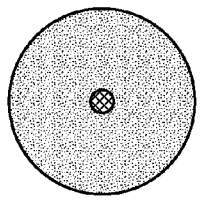
FIGS. 3A-3E are cross-sectional views of different portions of the tilt meter of FIG. 2.
Figure 3B:
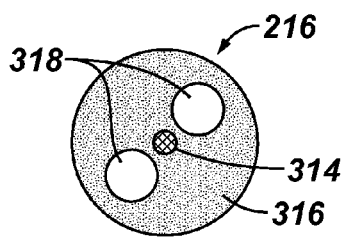
Figure 3C:
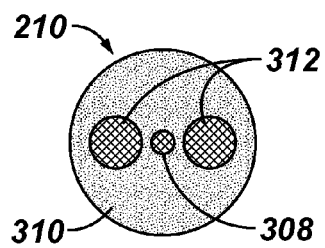
Figure 3D:
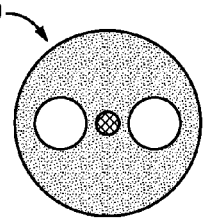
Figure 3E:
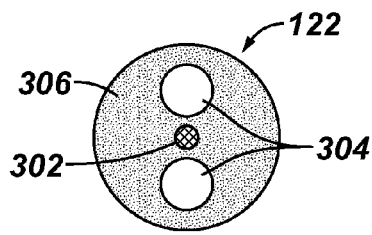

FIGS. 3A-3E illustrate cross-sectional views of different portions of the tilt meter 100, as indicated by the sectional lines 3A-3A, 3B-3B, 3C-3C, 3D-3D, and 3E-3E. The cross-sectional views of FIGS. 3B-3E depict use of side-hole optical fibers, which are well-suited for measurement of pressure. FIG. 3E shows a cross-sectional view of a portion of the second optical fiber section 122. The optical fiber section 122 includes a waveguiding core 302 surrounded by a cladding layer 306. The waveguiding core 302 is used to propagate light. In addition, two longitudinal air holes 304 are formed in the cladding layer 306 that run along the length of the optical fiber section 122. The two longitudinal air holes 304 are generally parallel to the waveguiding core 302. The two air holes are positioned one on each side of the core 302. This gives the optical fiber section 122 the necessary asymmetry for birefringence. It is noted that any optical fiber having a pressure sensitive birefringence can be used, such as certain types of asymmetric photonic crystal fiber.

FIG. 3D shows the cross-sectional view of the first optical fiber section 120, where the azimuthal orientation of the first optical fiber section 120 is rotated approximately 90° with respect to the second optical fiber section 122. The first optical fiber section 120 depicted in FIG. 3D similarly includes the combination of a core, cladding layer, and air holes, similar to the arrangement of FIG. 3E, except with the orientation being 90° out of phase.

FIG. 3C depicts the cross-sectional view of the biasing optical fiber section 210, which includes a core 308, a cladding layer 310, and two longitudinal elements 312 corresponding to the air holes 304 of FIG. 3E, except that the two longitudinal elements are solid (as opposed to being air holes).

FIG. 2 further depicts a reflecting device 218 (which can be implemented with a mirror, for example), provided at the far end of the second optical fiber section 122. The mirror 218 is provided to reflect the interrogating light that has passed through the first and second optical fiber sections 120, 122, back towards the fiber optical cable 102 for transmission to the interrogating system 110 (FIG. 1). In alternative implementations, instead of using the mirror 218 at the far end of the second fiber optical section 122, other types of reflecting devices can be employed, such as Bragg gratings written onto an optical fiber (such as one of optical fiber sections 120, 122).

FIG. 2 further depicts a polarizer 216 provided in the second inner chamber 212 of the tilt meter 100. The polarizer 216 ensures that light from the downlead (including the first and second optical fiber sections 120, 122 and the mirror 218) is polarized and launched roughly equally in two polarization modes. As shown in FIG. 3B, which illustrates the cross-sectional view of the polarizer 216, the orientation of the polarizer 216 is approximately 45° with respect to the orientation of each of the first and second optical fiber sections 120, 122. The polarizer 216 includes a core 314 within a cladding layer 316, which also contains two longitudinal air holes 318 on the two sides of the core 314.

Interrogating light transmitted from the fiber optic cable into the tilt meter 100 is received by the polarizer 216 and passed to the downlead. The polarizer 216 analyzes the return light from the downlead and blocks the light that has experienced a birefringence of $\pm\pi/2$ modulo $2\pi$. As a result, the polarizer 216 converts polarization information into amplitude information that can be transmitted to the remote interrogating system 110 (FIG. 1), for decoding into differential pressure and thus into a tilt reading.

FIG. 2 also shows three Bragg gratings BG_0, BG_1, and BG_2. The first Bragg grating (BG_0) between the pressure barriers 202 and 214 is written onto a portion 220 of an optical fiber. The Bragg grating BG_0 provides a temperature reading that can be communicated back over the fiber optic cable 102 to the interrogating system 110. The temperature reading of the Bragg grating BG_0 can be used to compensate for temperature around the tilt meter 100, if necessary. It is possible that the biasing optical fiber section 210 is temperature-sensitive, and thus the Bragg grating BG_0 can be used to correct for that temperature sensitivity.

Bragg gratings BG_1 and BG_2 are written onto the first and second optical fiber sections 120 and 122, respectively. The resulting splitting of the reflection spectra of the Bragg gratings BG_1 and BG_2 may be used to provide a measure of the average pressure on the first and second optical fiber sections 120 and 122, to eliminate any residual common-mode pressure.

Figure 4:
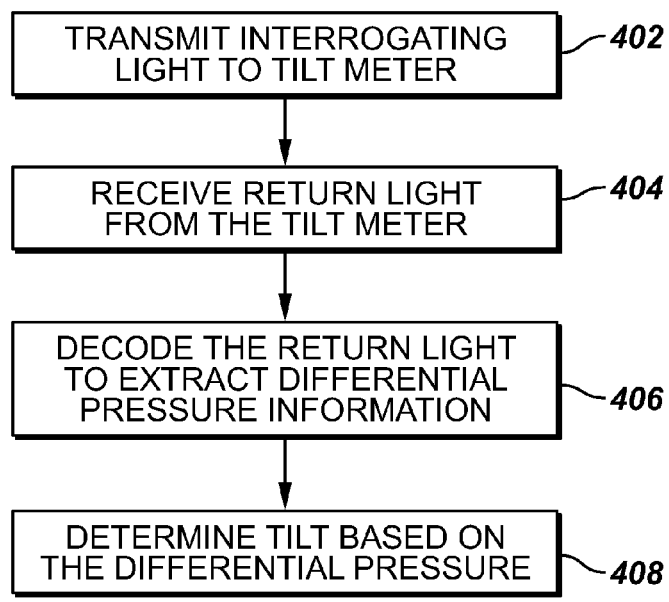
FIG. 4 is a flow diagram of a process of measuring tilt within a well using a tilt meter according to some embodiments.

FIG. 4 is a flow diagram of a general process of determining tilt, in accordance with an embodiment. An interrogating light is transmitted (at 402) to the tilt meter 100. In some embodiments, the interrogating light is transmitted by the light source 112 in the interrogating system 110 (FIG. 1). The interrogating system 110 then receives (at 404) return light from the tilt meter 100.

The return light is decoded (at 406) to extract differential pressure information. The tilt is then determined (at 408) based on the differential pressure. The processing at 406 and

408 can be performed by a combination of the interrogating system 110 and the controller 114.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A tilt meter comprising:
    a housing structure defining an inner chamber sealed from an environment outside the housing structure;
    a first optical fiber section in the inner chamber;
    a second optical fiber section in the inner chamber and optically coupled to the first optical fiber section, wherein the second optical fiber section is rotated azimuthally with respect to the first optical fiber section,
    wherein the first and second optical fiber sections are arranged to receive light transmitted from a remote light source, and
    wherein a tilt of the housing structure induces a differential pressure within the inner chamber to be detected by the first and second optical fiber sections.

2. The tilt meter of claim 1, further comprising:
    a reflecting device to reflect light passed through the first and second optical fiber sections back to an interrogation system to provide an indication of the tilt of the housing structure.

3. The tilt meter of claim 1, further comprising a buffer fluid in the inner chamber, wherein the first and second optical fiber sections are immersed in the buffer fluid, wherein the tilt of the housing structure causes pressure variation in the buffer fluid that is detectable by the first and second optical fiber sections.

4. The tilt meter of claim 3, wherein the buffer fluid includes a liquid metal.

5. The tilt meter of claim 3, wherein a difference in birefringence between the first and second optical fiber sections varies according to the pressure variation.

6. The tilt meter of claim 3, further comprising an inert gas in the inner chamber to decouple the inner chamber from pressure in the environment outside the housing structure.

7. The tilt meter of claim 1, wherein the second optical fiber section is rotated azimuthally by at least 45° with respect to the first optical fiber section.

8. The tilt meter of claim 7, wherein the second optical fiber section is rotated by approximately 90° with respect to the first optical fiber section.

9. The tilt meter of claim 1, further comprising:
    a first pressure barrier that cooperates with the housing structure to define the inner chamber;
    a second pressure barrier that cooperates with the first pressure barrier and the housing structure to define a second chamber; and
    a third optical fiber section optically coupled to the first optical fiber section through the first pressure barrier, wherein the third optical fiber section is a biasing element to provide a path difference between two principal polarization axes even in an absence of differential pressure in the inner chamber.

10. The tilt meter of claim 9, further comprising a polarizer in the second chamber configured to receive light reflected by a downlead including the first and second optical fiber sections, and to apply polarization to the reflected light to cause light provided back to an interrogation system to be launched approximately equally in two polarization modes.

11. The tilt meter of claim 10, wherein the polarizer is configured to convert polarization information into amplitude information for transmission to the interrogation system.

12. The tilt meter of claim 1, further comprising an optical temperature sensor in the housing structure, wherein temperature information detected by the optical temperature sensor is to be provided to an interrogation system to enable compensation of output of the tilt meter for temperature.

13. The tilt meter of claim 12, further comprising a third optical fiber section optically coupled to the first optical fiber section, wherein the optical temperature sensor comprises a Bragg grating on the third optical fiber section.

14. The tilt meter of claim 1, further comprising first and second Bragg gratings on the corresponding first and second optical fiber sections, wherein the first and second Bragg gratings are configured to provide a measure of average pressure acting on the first and second optical fiber sections to eliminate any residual common-mode pressure.

\* \* \* \* \*